Oct. 13, 1953  A. A. H. KENLOCK  2,655,239
CONNECTOR STRIP
Filed Sept. 1, 1951
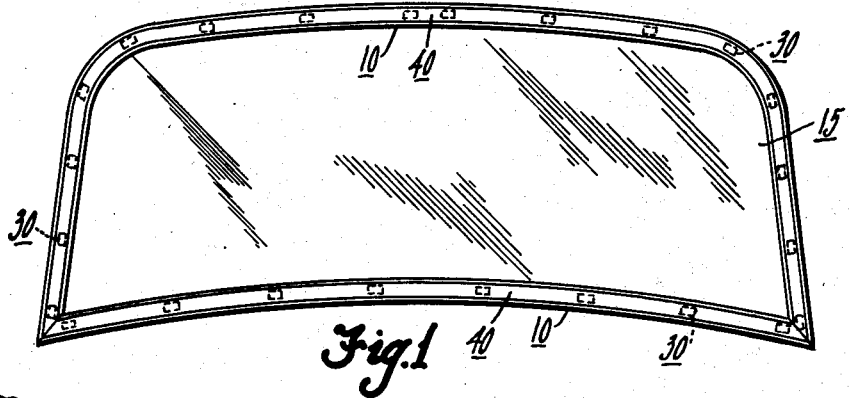
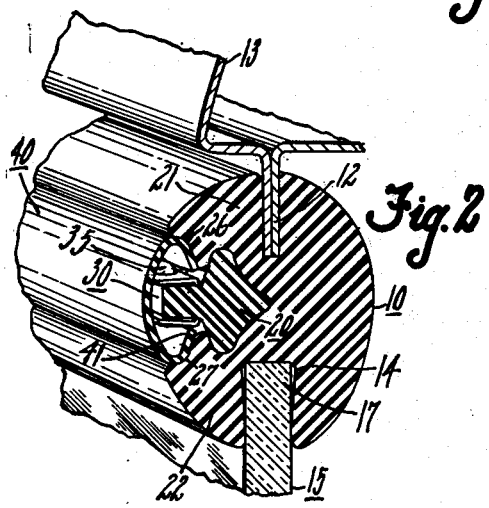
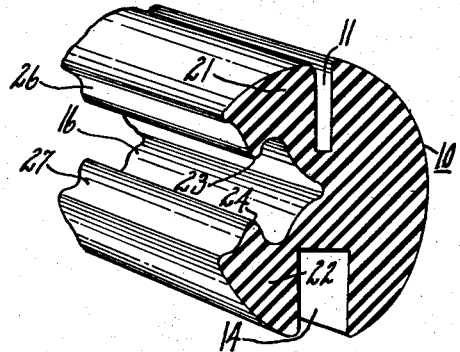
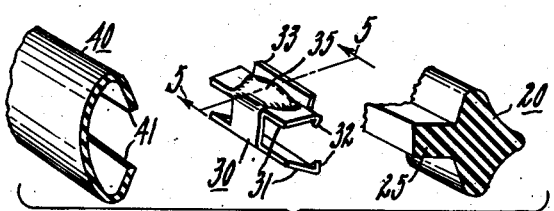
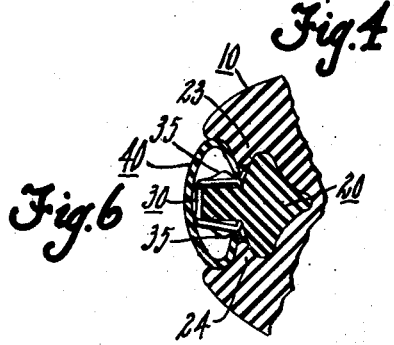
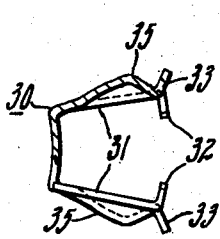
INVENTOR.
ALBERT A. H. KENLOCK
BY
HIS ATTORNEYS Patented Oct. 13, 1953

2,655,239

UNITED STATES PATENT OFFICE 2,655,239

CONNECTOR STRIP

Albert Alexander Hobart Kenlock, Stoke Hammond, near Bletchley, England, assignor to General Motors Corporation, Detroit, Mich., a corporation of Delaware Application September 1, 1951, Serial No. 244,764
In Great Britain January 17, 1951

4 Claims. (Cl. 189—78)

This invention relates to resilient connector strips adapted to connect panels and the like in edge-to-edge relation.

An object of the invention is to provide a connector strip of the type disclosed in U. S. Patents Nos. 2,189,137 and 2,139,138 to F. R. Eichner, which includes a filler strip which acts as a wedge for sealing the strip to the parts connected thereby and a series of spaced clips attached to the filler strip and serving as attachment means for a trim molding for said connector strip.

Further objects and advantages of the present invention will be apparent from the following description, reference being had to the accompanying drawings wherein a preferred embodiment of the present invention is clearly shown.

In the drawings:

Fig. 1 illustrates diagrammatically the use of the connector strip of this invention for mounting an automobile windshield or rear window of the automobile body.

Fig. 2 is a fragmentary view, in cross section and perspective, of the connector strip of this invention connecting a glass pane in edge to edge relation to a sheet metal member with the trim molding fully assembled thereupon.

Fig. 3 is a fragmentary view of the main resilient connector strip shown in Fig. 2 prior to assembling the connected parts thereto.

Fig. 4 is an exploded fragmentary view of the filler strip, one of the metal clips in position to be clamped upon the filler strip, and the trim molding in position to be snapped over the metal clips.

Fig. 5 is a cross section taken on line 5—5 of Fig. 4 on an enlarged scale and shows the metal clip prior to being clamped upon the flange of the filler strip.

Fig. 6 is a fragmentary cross sectional view of the filler strip, metal clip and trim molding in final assembled position.

Similar reference characters refer to similar parts throughout the several views.

Reference numeral 10 designates the main flexible connector strip of a suitable resilient material such as flexible rubber or rubber-like material. Strip 10 has a continuous longitudinal groove 11 therein for receiving edgewise the sheet metal flange 12 of the rigid metal frame 13 which supports the glass panel 15. Strip 10 also has a continuous longitudinal groove 14 for receiving the marginal portion 17 of the glass panel 15, and a continuous groove 16 for receiving a wedge-shaped filler strip 20 which acts as a wedge to compress the flexible wings 21 and 22 tightly against the marginal portions 12 and 17 respectively after they have been inserted into grooves 11 and 14. Thus after the filler strip 20 is forced into its groove 16 the marginal portions 12 and 17 will be held in sealed relation in grooves 11 and 14, and the filler strip 20 will be retained in place by the overhanging flexible lips 23 and 24 on said wings 21 and 22. Connecting strips made according to the above description are now well known, being disclosed in the above-mentioned prior Eichner Patents Nos. 2,189,137 and 2,189,138. The invention claimed in this application pertains to the hereinafter described method of applying and retaining an ornamental trim molding to the main connector strip.

According to this invention, the flexible filler strip 20 is provided with a continuous flange 25, preferably rectangular in cross section, which projects outwardly and free from adjacent portions of the main strip 10 when filler strip 20 is forced into its groove 16 in its final assembled position as shown in Figs. 2 and 6. Thereafter a series of metal clips 30 are fixed to the outwardly projecting flange 25 suitably spaced along the length of said flange. Clips 30 may be bent up from sheet metal into a generally U-shape (best shown in Figs. 4 and 5) having two opposed legs 31 each having inwardly bent pointed claws 32 adapted to be forced into the material of flange 25. Each U-shaped clip 30 may be readily slipped over the projecting flange 25 and then permanently clamped shut thereupon by means of a pair of pliers or the like to cause the claws 32 to bite into the flexible material of flange 25. Each clip 30 has an outwardly projecting bump 35 and a narrow outwardly projecting flange 33 on each of its legs 31.

The trim molding strip 40 has a resilient C-shaped cross section such that it can be aligned parallel to the flange 25 of filler strip 20 and then pushed over the metal clips 30 so that the opposed edges 41 of the C-section will be cammed outwardly sufficiently to snap over the bumps 35 and contact flanges 33 as clearly shown in Fig. 6.

Fig. 1 of the drawings shows a glass pane 15 having curved edges mounted in place by two separate lengths of the connecting strip of this invention. One length thereof extends across the slightly curved bottom of pane 15 and the other length extends around the other three edges thereof. The trim strip 40 may be given its required curved outline shape prior to being snapped upon the metal retaining clips 30 as described above.

The wing portions 21 and 22 of main strip 10 are preferably recessed at 26 and 27 to snugly receive trim strip 40 when it is in its final assembled position, as clearly shown in Figs. 2 and 6. It will be noted that in the final assembly trim strip 40 thus aids the filler strip 20 in retaining the flexible wings 21 and 22 spread apart and more firmly pressed against the marginal portions 12 and 17 of the connected panels.

While the embodiment of the present invention as herein disclosed, constitutes a preferred form, it is to be understood that other forms might be adopted.

What is claimed is as follows:

1. In combination, a connector strip of flexible resilient material having a wedge groove extending longitudinally thereof, an auxiliary strip of flexible material having a wedge portion pressed into said wedge groove in interlocking relation therewith and thereby retained assembled upon said connector strip, said auxiliary strip having a relatively narrow exteriorly accessible longitudinal flange projecting outwardly therefrom free from adjacent portions of said connector strip, a series of separate generally U-shaped metal clips each having two legs for straddling said flange, said legs including opposed ledge portions intermediate the ends thereof and also including inwardly extending claws at the free extremities thereof clamped around the projecting edge of said flange at spaced intervals along the length thereof, and a trim strip for overlying and concealing said auxiliary strip and secured thereto by opposed edges thereof resiliently engaging opposed ledge portions on a plurality of said metal clips, said trim strip being so dimensioned that the said legs of the clips are forced inwardly thereby for causing the claws to be held in clamping engagement with said flange, thereby holding the trim strip and the separate metal clips to the connector strip.

2. In combination, a cushioning connector strip of resilient deformable material having a pair of longitudinal grooves therein to receive the adjacent edges of two panels to be joined thereby, said strip also having a wedge groove extending longitudinally between said panel grooves, an auxiliary strip having a wedge portion insertable into said wedge groove in interlocking relation therewith to expand same and thereby resiliently close said panel grooves upon the panel edges inserted therein, said auxiliary strip having an exteriorly accessible longitudinal flange portion projecting laterally outwardly therefrom, a series of separate metal clips adapted to be fixed to said flange at spaced intervals along the length thereof, and a trim strip having a C-shaped cross section overlying and concealing said auxiliary strip and secured thereto by the opposed edges of its C-section engaging opposite portions of said plurality of said metal clips for fixing said clips to the flange whereby both the clips and the trim strip are held to the connector strip.

3. In combination, a cushioning connector strip of resilient deformable material having a pair of longitudinal grooves therein to receive the adjacent edges of two panels to be joined thereby, said strip also having a wedge groove extending longitudinally between said panel grooves, an auxiliary strip having a wedge portion insertable into said wedge groove in interlocking relation therewith to expand same and thereby resiliently close said panel grooves upon the panel edges inserted therein, said auxiliary strip having an outwardly projecting continuous flange, a series of generally U-section metal clips enclosing the outer edge of said flange at spaced intervals along the length thereof, said clips each being adapted for attachment to said flange by its opposed leg portions being bent into tight engagement with opposite sides of said flange, and a trim strip of general C-section overlying and concealing said auxiliary strip and acting upon said clips for bending the opposed leg portions thereof into tight engagement with opposite sides of said flange.

4. A connector strip adapted to connect two spaced panels, comprising in combination; a body portion of resilient deformable material having a pair of generally opposed longitudinal grooves therein, each adapted to receive the edge of one of said panels to be joined, a longitudinal flange extending from said body portion intermediate said grooves so as to be exteriorly accessible with respect to said strip, a plurality of clips, each having a generally U-shaped cross section adapted to embrace said flange and overlie the same on either side thereof, each of said clips including two legs, each having an outwardly extending portion thereon and each having an inwardly extending claw at the outer extermity thereof and a trim strip adapted to pass over said flange and said clips behind said outwardly extending portions and being so dimensioned as to compress the legs of said clips towards one another for causing the claw portions thereof to bite into the flange material for holding the clips firmly to the flange whereby the trim strip is attached to the connector strip.

ALBERT ALEXANDER HOBART KENLOCK.

References Cited in the file of this patent

UNITED STATES PATENTS

| Number | Name | Date |
|---|---|---|
| 1,961,352 | Hall | June 5, 1934 |
| 2,189,138 | Eichner | Feb. 6, 1940 |
| 2,350,430 | Ulrich | June 6, 1944 |
| 2,497,276 | Scott et al. | Feb. 14, 1950 |
| 2,547,799 | Wernig | Apr. 3, 1951 |
| 2,556,775 | Oswald | June 12, 1951 |